United States Patent
Rowe et al.

(10) Patent No.: US 11,453,347 B2
(45) Date of Patent: Sep. 27, 2022

(54) SUCTION DEVICES HAVING ARTIFICIAL MUSCLES

(71) Applicant: TOYOTA MOTOR ENGINEERING & MANUFACTURING NORTH AMERICA, INC., Plano, TX (US)

(72) Inventors: Michael P. Rowe, Pinckney, MI (US); Jillian M. Jakubiec, Bloomfield Hills, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 321 days.

(21) Appl. No.: 16/816,491

(22) Filed: Mar. 12, 2020

(65) Prior Publication Data

US 2021/0284079 A1    Sep. 16, 2021

(51) Int. Cl.
*B60R 11/02* (2006.01)
*F16B 47/00* (2006.01)
*B60R 11/00* (2006.01)

(52) U.S. Cl.
CPC .......... *B60R 11/0241* (2013.01); *F16B 47/00* (2013.01); *B60R 2011/0056* (2013.01)

(58) Field of Classification Search
CPC .... F16B 47/00; F16B 47/006; B60R 11/0241; B60R 11/0258; B60R 2011/0003;
(Continued)

(56) References Cited

U.S. PATENT DOCUMENTS 6,116,257 A * 9/2000 Yokota .................. F15B 21/065
                                                          137/1
6,586,859 B2   7/2003 Kornbluh et al.
(Continued)

FOREIGN PATENT DOCUMENTS

CN   207382213 U    5/2018
CN   209812321 U   12/2019
(Continued)

OTHER PUBLICATIONS

Shane Mitchell, et al., "An Easy-To-Implement Toolkit To Create Versatile And High-Performance HASEL Actuators For Untethered Soft Robots," Journal Article, Advanced Science 6(14):1900178, Jun. 2019, URL: https://www.researchgate.net/figure/Generalized-principle-of-zipping-mode-actuation-in-HASEL-actuators-As-Voltage-is_fig1_333725822, 15 pages.
(Continued)

*Primary Examiner* — Jonathan Liu
*Assistant Examiner* — Guang H Guan
(74) *Attorney, Agent, or Firm* — Dinsmore & Shohl LLP (57) ABSTRACT

A suction device including a casing having a central post extending through the casing. A flexible member is provided across a free end of the central post. One or more artificial muscles are housed within the casing and encircle the central post, each artificial muscle including a housing having a first wall and a second wall opposite the first wall. The housing having an electrode region adjacent an expandable fluid region, a dielectric fluid housed within the housing, and an electrode pair housed within the electrode region of the housing. The electrode pair includes a first electrode coupled to the first wall and a second electrode coupled to the second wall. The electrode pair is actuatable between a non-actuated state and an actuated state such that actuation from the non-actuated state to the actuated state directs the dielectric fluid into the expandable fluid region and deforms the flexible member to form a suction area at the free end of the central post.

20 Claims, 7 Drawing Sheets

(58) Field of Classification Search
CPC ..... B60R 2011/0005; B60R 2011/0056; B60R 2011/0064; B60R 2011/0068; B66C 1/02–0293
USPC ....... 248/205.5–206.3, 309.3, 362, 363, 537, 248/683
See application file for complete search history.

(56) References Cited

U.S. PATENT DOCUMENTS

| | | | |
|---|---|---|---|
| 7,679,261 | B2 | 3/2010 | Chappaz et al. |
| 7,813,047 | B2 | 10/2010 | Wang et al. |
| 8,237,324 | B2 | 8/2012 | Pei et al. |
| 8,485,581 | B2 | 7/2013 | McKnight et al. |
| 8,779,646 | B2 | 7/2014 | Hino et al. |
| 9,602,641 | B2 | 3/2017 | Kim et al. |
| 10,233,910 | B2 | 3/2019 | Mazzeo et al. |
| 10,632,596 | B2 * | 4/2020 | Buckus ................. B25B 11/005 |
| 10,995,779 | B2 * | 5/2021 | Keplinger ............... F15B 15/08 |
| 11,041,576 | B2 * | 6/2021 | Gandhi .................. H02N 1/006 |
| 11,081,975 | B2 * | 8/2021 | Gandhi .................. H02N 1/006 |
| 11,088,635 | B2 * | 8/2021 | Gandhi .................. F15B 15/10 |
| 11,195,506 | B2 * | 12/2021 | Gandhi ............ G10K 11/17873 |
| 11,253,996 | B1 * | 2/2022 | Rowe ....................... F03G 7/062 |
| 2005/0288597 | A1 | 12/2005 | Kishimoto et al. |
| 2009/0115285 | A1 * | 5/2009 | Najafi ....................... F15B 7/00 29/25.35 |
| 2016/0321880 | A1 | 11/2016 | Hamam et al. |
| 2019/0126516 | A1 | 5/2019 | Pikul et al. |
| 2021/0237809 | A1 * | 8/2021 | Rowe ....................... B60R 16/03 |
| 2021/0284079 | A1 * | 9/2021 | Rowe ....................... B60R 11/02 |
| 2022/0021314 | A1 * | 1/2022 | Rowe ....................... F03G 7/00 |

FOREIGN PATENT DOCUMENTS

| | | |
|---|---|---|
| EP | 0924033 A2 | 6/1999 |
| EP | 1221180 B1 | 7/2002 |
| GB | 2563896 B | 7/2019 |
| JP | 2007097259 A | 4/2007 |
| JP | 2007097292 A | 4/2007 |
| JP | 2012044447 A | 3/2012 |
| JP | 6207478 B2 | 11/2014 |
| JP | 6102610 B2 | 3/2017 |
| KR | 20070119985 A | 12/2007 |
| KR | 20090068130 A | 6/2009 |
| KR | 20160117658 A | 10/2016 |
| WO | 2011054394 A | 5/2011 |
| WO | 2015023803 A1 | 2/2015 |
| WO | 2018175744 A1 | 9/2018 |
| WO | 2018232386 A1 | 12/2018 |
| WO | 2019002860 A1 | 1/2019 |
| WO | 2019173227 A1 | 9/2019 |

OTHER PUBLICATIONS

Li, et al., Fluid-driven origami-inspired artificial muscles (https://www.pnas.org/content/114/50/13132) Published: Nov. 27, 2017.

Pikul, et al., Stretchable surfaces with programmable 3D texture morphing for synthetic amouflaging skins (https://science.sciencemag.org/content/358/6360/210). Published: Oct. 13, 2017.

Ceron, et al., Fiber embroidery of self-sensing soft actuators (https://www.mdpi.com/2313-7673/3/3/24/htm). Published: Sep. 4, 2018.

Cao, et al., Development of a soft untethered robot using artificial muscle actuators (https://www.spiedigitallibrary.org/conference-proceedings-of-spie/10163/101631X/Development-of-a-soft-untethered-robot-using-artificial-muscle-actuators/10.1117/12.2260375.short?SSO=1). Published: Apr. 17, 2017.

Acome, et al., Hydraulically amplified self-healing electrostatic actuators with muscle-like performance, Keplinger Science, Jan. 5, 2018; vol. 359, Issue 6371, pp. 61-65.

* cited by examiner

SUCTION DEVICES HAVING ARTIFICIAL MUSCLES

TECHNICAL FIELD

The present specification generally relates to suction devices for securing objects and, more specifically, artificial muscles including electrode pairs forming suction devices for securing objects

BACKGROUND

With the increased use of mobile devices providing navigation instructions and software applications used during driving, mobile device holders are becoming more popular. These mobile device holders are typically provided in a cup holder of the vehicle or on the dashboard in order to allow the driver of the vehicle to observe and operate the mobile device and limit the amount of time the driver takes his or her eyes off the road. These mobile device holders typically include a clamping mechanism in order to retain mobile devices of varying sizes.

The location that these mobile device holders can be used is limited based on the attachment mechanism provided. As such, the mobile device holder may only be connectable to a vent in the dashboard or the cup holder. In addition, the mobile device must be secured to the holder manually by adjusting the clamping mechanism of the holder for each use.

Accordingly, a need exists for alternative holders for securing an object such as a mobile device that may be operated automatically and not limited to manual operation.

SUMMARY

In one embodiment, a suction device includes a casing having a top wall, a bottom wall, and a central post extending from the bottom wall. A flexible member is provided across a free end of the central post. One or more artificial muscles are housed within the casing and encircle the central post, each artificial muscle including a housing having a first wall, a second wall opposite the first wall, and an electrode region adjacent an expandable fluid region, a dielectric fluid housed within the housing, and an electrode pair housed within the electrode region of the housing. The electrode pair includes a first electrode coupled to the first wall and a second electrode coupled to the second wall. The electrode pair is actuatable between a non-actuated state and an actuated state such that actuation from non-actuated state to the actuated state directs the dielectric fluid into the expandable fluid region and deforms the flexible member to form a suction area at the free end of the central post.

In another embodiment, a vehicle including an interior vehicle surface and a suction device provided within the interior vehicle surface. The suction device includes a casing having a top wall, a bottom wall, and a central post extending from the bottom wall of the casing. A flexible member is provided across a free end of the central post. One or more artificial muscles are housed within the casing and encircle the central post, each artificial muscle including a housing having a first wall, a second wall opposite the first wall, and an electrode region adjacent an expandable fluid region, a dielectric fluid housed within the housing, and an electrode pair housed within the electrode region of the housing. The electrode pair includes a first electrode coupled to the first wall and a second electrode coupled to the second wall. The electrode pair is actuatable between a non-actuated state and an actuated state such that actuation from non-actuated state to the actuated state directs the dielectric fluid into the expandable fluid region and deforms the flexible member to form a suction area at the free end of the central post.

In yet another embodiment, a method for retaining an object in a position includes positioning an object over an access hole formed in an interior vehicle surface, where the access hole is aligned with a suction device. The suction device includes a casing having a top wall, a bottom wall, and a central post extending from the bottom wall of the casing, a flexible member provided across a free end of the central post, one or more artificial muscles housed within the casing and encircling the central post. In addition, each artificial muscle includes a housing having a first wall and a second wall opposite the first wall, the housing having an electrode region adjacent an expandable fluid region, a dielectric fluid housed within the housing and an electrode pair housed within the electrode region of the housing, the electrode pair including a first electrode coupled to the first wall and a second electrode coupled to the second wall. The method also includes grasping the object by actuating the electrode pair of the one or more artificial muscles of the suction device from a non-actuated state to an actuated state to direct the dielectric fluid into the expandable fluid region, thereby deforming the flexible member to form a suction area at the free end of the central post.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to a suction device that includes at least one artificial muscle, which is actuatable to selectively raise and lower a region of the artificial muscle to provide a selective, on demand object holder. The suction device includes a casing having a central post extending from a bottom wall of the casing. A flexible member is provided across a free end of the central post and one or more artificial muscles are housed within the casing and encircle the central post. The artificial muscle includes a housing having a first wall opposite a second wall. The housing includes an electrode region adjacent an expandable fluid region, a dielectric fluid housed within the housing, and an electrode pair housed within the electrode region of the housing. The electrode pair includes a first electrode coupled to the first wall and a second electrode coupled to the second wall. The electrode pair is actuatable between a non-actuated state and an actuated state such that actuation from the non-actuated state to the actuated state directs the dielectric fluid into the expandable fluid region. This expands the expandable fluid region, raising a portion of the artificial muscle on demand. Thus, actuation of the electrode pair forms a protrusion defining a suction area to retain an object in position. Various embodiments of the suction device and the operation of the suction device are described in more detail herein. Whenever possible, the same reference numerals will be used throughout the drawings to refer to the same or like parts.

Figure 1:
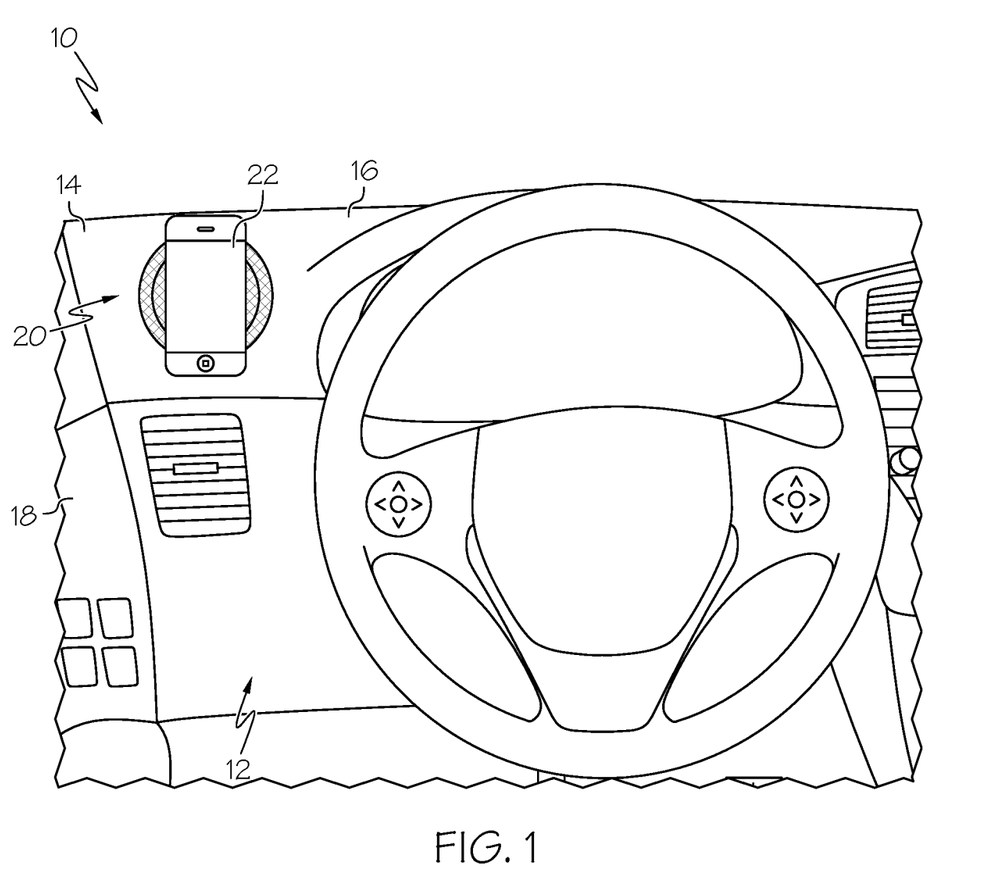
FIG. 1 schematically depicts a suction device provided on an interior vehicle surface, according to one or more embodiments shown and described herein.

Referring now to FIG. 1, a vehicle 10 including an interior cabin 12 is illustrated. The interior cabin 12 includes a plurality of interior vehicle surfaces 14 including, for example, a dashboard 16 and a side arm panel 18. As shown, a suction device 20 is illustrated according to one or more embodiments described herein. The suction device 20 is shown provided within the dashboard 16. However, it should be understood that the suction device 20 may be provided on any other interior vehicle surface 14 such as the side arm panel 18 or any other suitable surface within the interior cabin 12. As described in more detail below, the suction device 20 is operable between a non-actuated state and an actuated state. When in the actuated state, the suction device 20 creates suction between the suction device 20 and an object 22 placed thereon. Thus, the suction device 20 is suitable for securing an object 22, such as, for example, a mobile device, navigation system, and the like.

Figure 2:
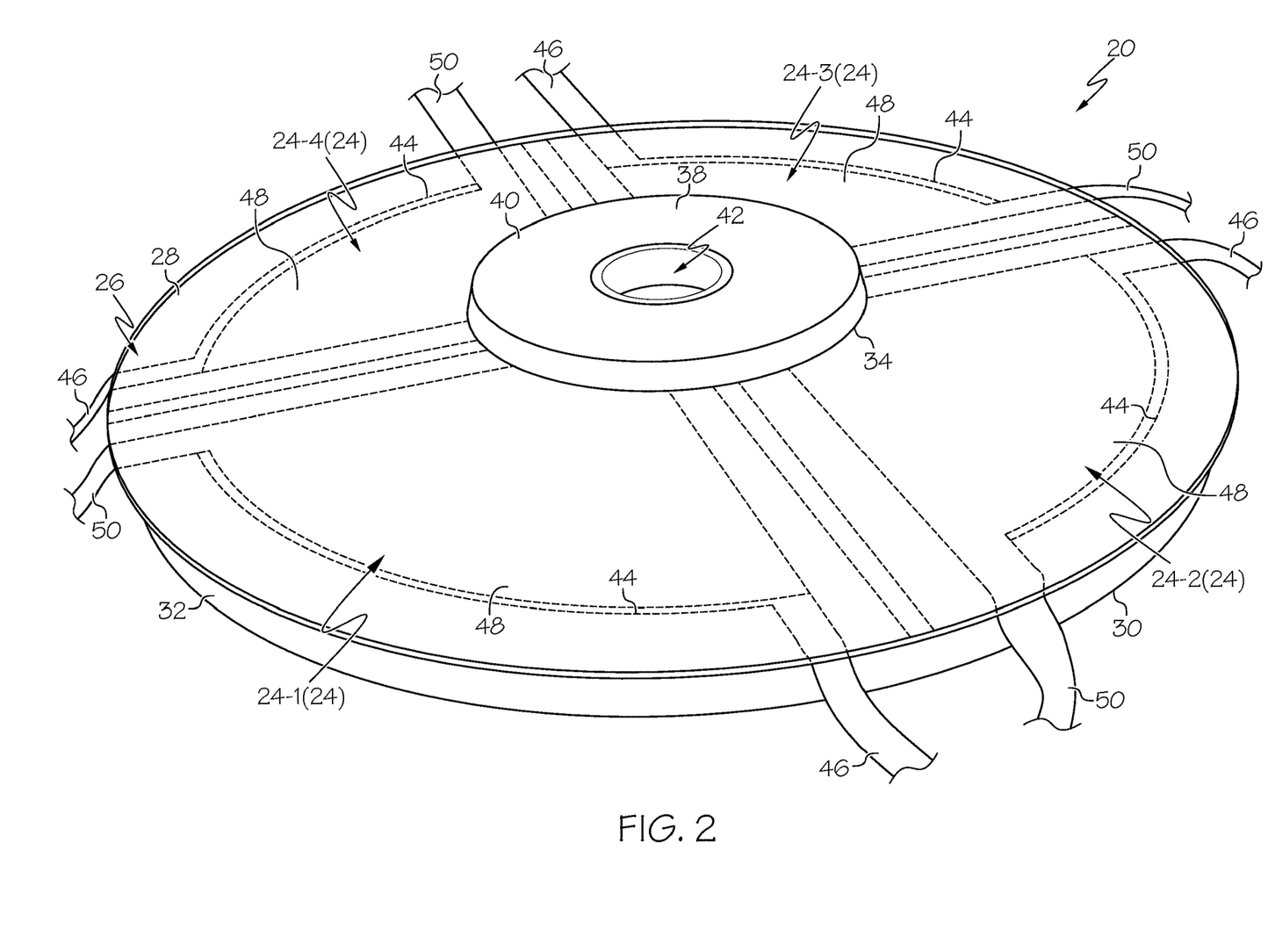
FIG. 2 schematically depicts a perspective view of the suction device including a plurality of artificial muscles in an actuated state, according to one or more embodiments shown and described herein.

Referring now to FIG. 2, the suction device 20 is shown in the actuated state separate from the dashboard 16. The suction device 20, described in more detail below, includes at least one artificial muscle 24. In some embodiments, the artificial muscle 24 is torus-shaped. In some embodiments, the suction device 20 includes a plurality of individual artificial muscles arranged to form a torus-shaped configuration. Specifically, the suction device 20 as shown includes four artificial muscles 24-1, 24-2, 24-3, 24-4. The artificial muscles 24-1, 24-2, 24-3, 24-4 abut against one another and are arranged to form the torus-shaped configuration. It is to be understood that the plurality of artificial muscles 24-1, 24-2, 24-3, 24-4, when employed, simultaneously operate between the non-actuated state and the actuated state.

Each artificial muscle 24-1, 24-2, 24-3, 24-4 is substantially similar in structure and their operation. Thus, throughout the ensuing description, it is to be understood that reference to the artificial muscles 24-1, 24-2, 24-3, 24-4 will collectively be referred to as the artificial muscle 24. Identical parts in each artificial muscle 24-1, 24-2, 24-3, 24-4 will be indicated with like reference numbers. It should also be understood that reference to the artificial muscle 24 may refer to a single artificial muscle or a plurality of individual artificial muscles utilized by the suction device 20 without limiting the scope of the disclosed concept.

Referring still to FIG. 2, the suction device 20 generally includes a casing 26 for housing each artificial muscle 24. The casing 26 may be formed from any suitable material, such as, for example, acrylic. The casing 26 has a top wall 28, a bottom wall 30, and a side wall 32. The casing 26 may be any suitable geometry. As shown, the casing 26 has a circular geometry and conforms to the geometry of the artificial muscle 24. The top wall 28 of the casing 26 has a lip 34 defining an opening 36 (FIGS. 5 and 6) formed therein. A flexible member 38 extends along an interior surface 110 (FIGS. 5 and 6) of the top wall 28 and continues to extend beyond the lip 34 of the top wall 28 to cover the opening 36 of the casing 26. When the artificial muscle 24 of the suction device 20 actuates to the actuated state, the artificial muscle 24 forms a protrusion 40 in a portion of the flexible member 38 and creates a suction area 42, discussed in more detail below.

The artificial muscle 24 includes a first electrode 44 having a first tail 46 and a second electrode 48 having a second tail 50. The first tail 46 and the second tail 50 extend out of the artificial muscle 24 and out of the casing 26. In order to prevent leakage of fluid out of the artificial muscle 24, the artificial muscle 24 may be sealed using an adhesive or any other suitable means. The tails 46, 50 are electrically coupled, either directly or in series, to a power supply to provide power to the artificial muscle 24.

Figure 3:
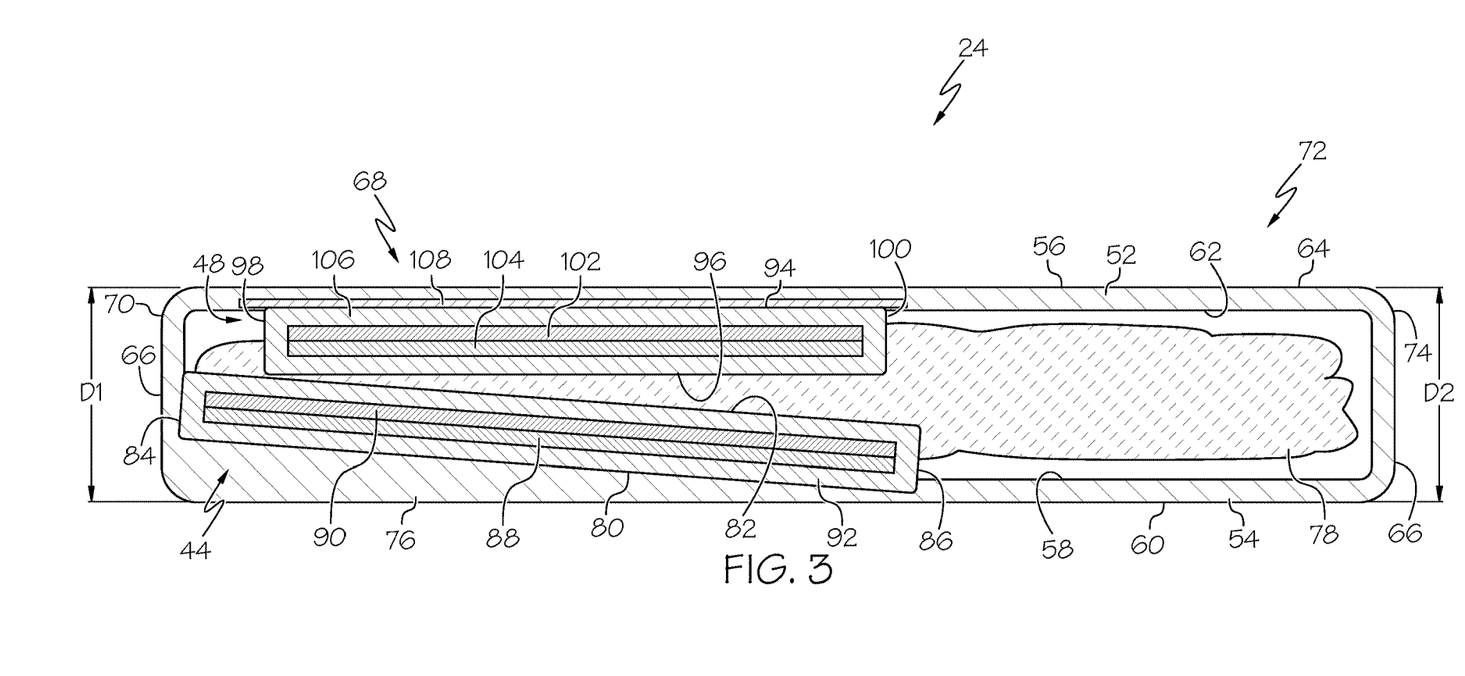
FIG. 3 schematically depicts a cross-sectional view of an artificial muscle of the suction device in a non-actuated state, according to one or more embodiments shown and described herein.
Figure 4:
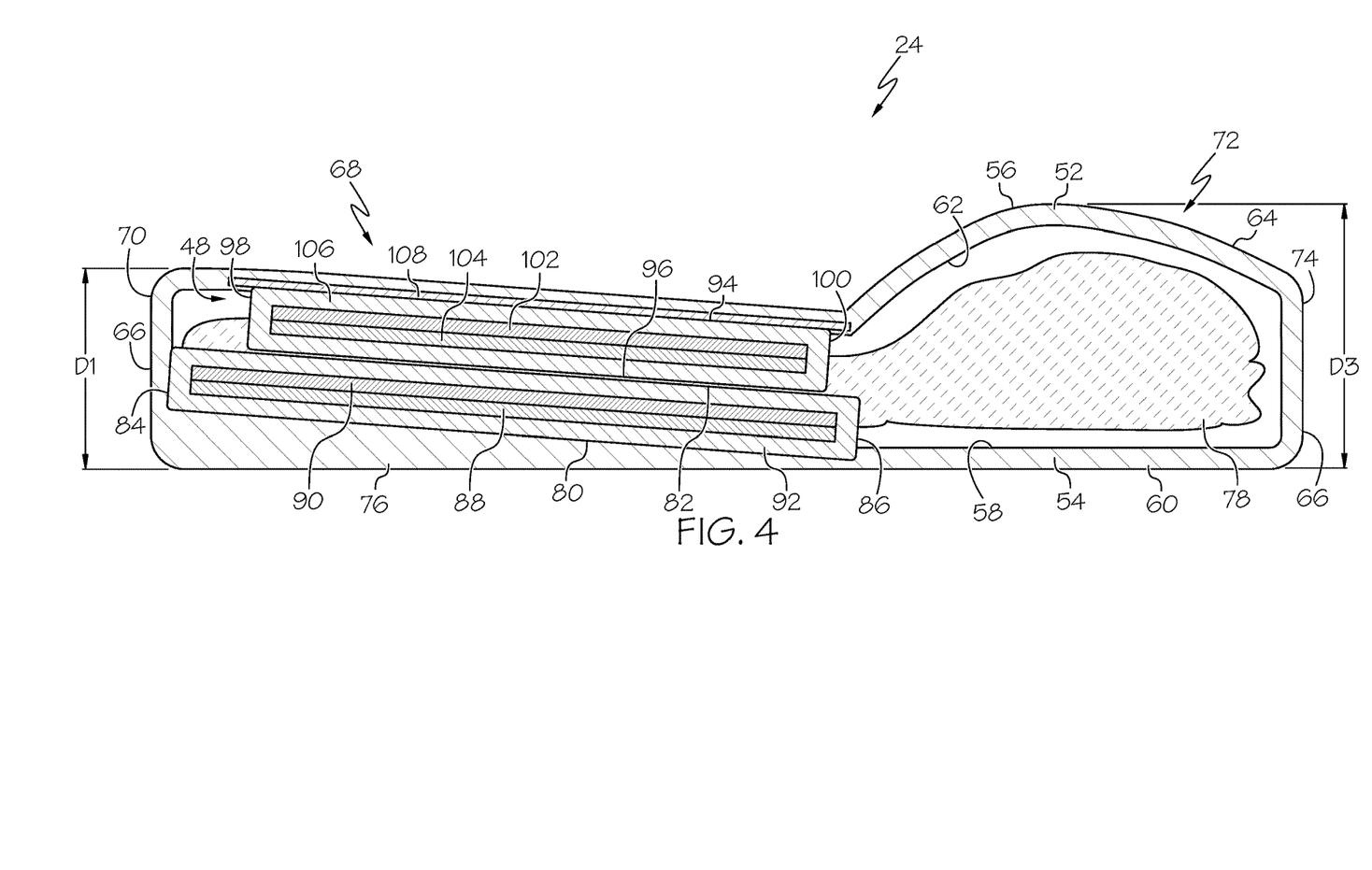
FIG. 4 schematically depicts a cross-sectional view of an artificial muscle of the suction device in the actuated state, according to one or more embodiments shown and described herein.

Now referring to FIGS. 3 and 4, cross-sectional views of the artificial muscle 24 in the non-actuated state (FIG. 3) and the actuated state (FIG. 4) are illustrated. The artificial muscle 24 includes a housing 52 having a first wall 54 and a second wall 56 opposite the first wall 54. The first wall 54 includes an interior surface 58 and an opposite exterior surface 60. Similarly, the second wall 56 includes an interior surface 62 and an opposite exterior surface 64. As depicted in FIGS. 3 and 4, the first wall 54 is a base wall and the second wall 56 is a second wall. The artificial muscle 24 includes at least one side wall 66 based on the geometry of the artificial muscle 24 for interconnecting the first wall 54 and the second wall 56 to enclose the housing 52. As shown, the artificial muscle 24 includes the side wall 66 extending around a perimeter of the artificial muscle 24 for joining the first wall 54 and the second wall 56 of the housing 52. The housing 52 also has an electrode region 68 provided at a first end 70 of the housing 52 and an expandable fluid region 72 provided at an opposite second end 74 of the housing 52. In some embodiments the housing 52 comprises a flexible material and is a flexible housing. For example, the flexible housing may comprise an elastomeric material such that it is an elastomeric housing.

In some embodiments, the first wall 54, the second wall 56, or both, has an interiorly tapered portion 76 to provide an interior slope within the electrode region 68 of the housing 52. As shown in FIGS. 3 and 4, the first wall 54 includes the interiorly tapered portion 76 extending from the first end 70 of the housing 52 toward the second end 74 thereof. In this embodiment, the interiorly tapered portion 76 has a thickness that is greater proximate the first end 70 of the housing 52 as compared to the thickness of the interiorly tapered portion 76 at a point distal from the side wall 66 and the first end 70. The interiorly tapered portion 76 may be integrally formed with the first wall 54 or, in some embodiments, it may be an additional structural component fixed to the first wall 54 to provide a sloped surface. As shown in FIGS. 3 and 4, the interiorly tapered portion 76 is integrally formed with the first wall 54 in order to raise the interior surface 58 of the first wall 54 within the electrode region 68 toward the second wall 56 and slope the interior surface 58 toward the second end 74 of the housing 52. It is to be understood that, in some embodiments, the interiorly tapered portion 76 may be provided on the second wall 56 instead of the first wall 54. In this embodiment, the interior surface 62 of the second wall 56 is extended closer to the first wall 54 within the electrode region 68 and sloped to provide a greater thickness at the first end 70 of the housing 52 as opposed to the thickness of the interiorly tapered portion 76 at a point distal the first end 70.

In the non-actuated state, when the interiorly tapered portion 76 is provided, the exterior surface 60 of the first wall 54 and the exterior surface 64 of the second wall 56 are both planar and substantially parallel to one another. More particularly, a first distance D1 between the exterior surface 60 of the first wall 54 and the exterior surface 64 of the second wall 56 within the electrode region 68 is substantially equal to a second distance D2 between the exterior surface 60 of the first wall 54 and the exterior surface 64 of the second wall 56 within the expandable fluid region 72. In some embodiments, when the interiorly tapered portion 76 is not provided, the first wall 54 and the second wall 56 are non-planar when in the non-actuated state.

A dielectric fluid 78 is provided within the housing 52 and sealed therein. A "dielectric" fluid as used herein is a medium or material that transmits electrical force without conduction and as such has low electrical conductivity. As discussed in more detail below, the dielectric fluid 78 flows freely between the first end 70 and the second end 74 of the housing 52. Some non-limiting example dielectric fluids include perfluoroalkanes, transformer oils, and deionized water.

A pair of electrodes 44, 48, including the first electrode 44 and the second electrode 48, are provided within the electrode region 68 of the housing 52 and fixed therein proximate the first end 70 and the side wall 66. One of the first electrode 44 and the second electrode 48 is a negatively charged electrode and the other of the first electrode 44 and the second electrode 48 is a positively charged electrode. For purposes discussed herein, either electrode 44, 48 may be positively charged so long as the other electrode 44, 48 within the artificial muscle 24 is negatively charged.

Referring still to FIGS. 3 and 4, the first electrode 44 has first surface 80, a second surface 82, a first end 84, and a second end 86. The first electrode 44 may comprise an inner polymer film 88 proximate the first surface 80 of the first electrode 44 and a flexible metal film 90 proximate the opposite second surface 82 of the first electrode 44 and disposed on the inner polymer film 88. The inner polymer film 88 functions as a backing for the flexible metal film 90. In some embodiments, the inner polymer film 88 comprises polyester and the flexible metal film 90 comprises aluminum. However, it should be understood that any suitable polymers and metals for forming an electrode are contemplated. In addition, the first electrode 44 includes a polymer cover coating 92 surrounding the inner polymer film 88 and the flexible metal film 90. The polymer cover coating 92 may comprise a different polymer than the inner polymer film 88. For example, in some embodiments, the polymer cover coating 92 comprises a polyimide having a silicone adhesive surface, such as Kapton tape.

The first surface 80 of the first electrode 44 (which is an outer surface of the polymer cover coating 92) is coupled to the interior surface 58 of the first wall 54 by any suitable means, such as an adhesive or the like. When the interiorly tapered portion 76 is provided and the first electrode 44 is provided thereon, the first electrode 44 is positioned to be slanted with respect to the second electrode 48 and the second wall 56. However, even when the interiorly tapered portion 76 is not provided, the first electrode 44 and the second electrode 48 are positioned to be slanted with respect to one another by orienting the first wall 54 and the second wall 56 to be non-parallel to one another. Although not shown in FIG. 3, the tail 46, shown in FIG. 2, is also coated with the polymer cover coating 92 and extends from the first electrode 44 out of the first end 70 of the housing 52 and out of the casing 26.

Similar to the first electrode 44, the second electrode 48 includes a first surface 94, a second surface 96, a first end 98, and a second end 100. The second electrode 48 includes an inner polymer film 102 proximate the first surface 94 of the second electrode 48 and a flexible metal film 104 proximate the opposite second surface 96 of the second electrode 48 and on the inner polymer film 102. The inner polymer film 102 functions as a backing for the flexible metal film 104. However, it should be understood that any suitable polymers and metals for forming an electrode are contemplated. The second electrode 48 also includes a polymer cover coating 106 wrapped around the inner polymer film 102 and the flexible metal film 104. The polymer cover coating 106 may comprise a different polymer than the inner polymer film 102. For example, in some embodiments, the polymer cover coating 106 comprises a polyimide having a silicone adhesive surface, such as Kapton tape.

Once wrapped by the polymer cover coating 106, the first surface 94 of the second electrode 48 is coupled to the interior surface 62 of the second wall 56 within the electrode region 68 by any suitable means, such as an adhesive or the like. As noted above, the first electrode 44 and the second electrode 48 are coupled to the first wall 54 and the second wall 56, respectively, at a slant relative to one another. In some embodiments, a stiffening film 108 is provided between the second electrode 48 and the second wall 56. The stiffening film 108 provides rigidity for at least a portion the second wall 56 when operating between the non-actuated state and the actuated state and the second electrode 48 is moved toward the first electrode 44 and the first wall 54. In some embodiments, the stiffening film 108 may be an acetate film. Although not shown in FIG. 3, the tail 50, shown in FIG. 2, is also coated with the polymer cover coating 106 and extends from the second electrode 48 out of the first end 70 of the housing 52 and the casing 26.

In addition, the first electrode 44 and the second electrode 48 are arranged at a slant relative to one another such that the distance between the first end 84 of the first electrode 44 and the first end 98 of the second electrode 48 is less than the distance between the second end 86 of the first electrode 44 and the second end 100 of the second electrode 48. This positions the first electrode 44 and the second electrode 48 in an acute or V-shape configuration. As a result, when actuated, the electrodes 44, 48 are configured to zipper toward one another, pushing the dielectric fluid 78 toward the expandable fluid region 72 and the second end 74 of the housing 52.

Referring now to FIG. 4, when the artificial muscle 24 is actuated, the first electrode 44 and the second electrode 48 are brought into contact with one another, which positions the first electrode 44 and the second electrode 48 substantially parallel to one another. In addition, the first distance D1 between the exterior surface 60 of the first wall 54 and the exterior surface 64 of the second wall 56 within the electrode region 68 is less than a third distance D3 between the exterior surface 60 of the first wall 54 and the exterior surface 64 of the second wall 56 within the expandable fluid region 72. The difference between the second distance D2 and the third distance D3 defines the amount of expansion of the second wall 56 of the housing 52 within the expandable fluid region 72 by the displaced dielectric fluid 78.

In order to move the first electrode 44 and the second electrode 48 toward one another, a voltage is applied. In some embodiments, a voltage of up to 10 kV may be provided from a power supply to induce an electric field through the dielectric fluid 78. The resulting attraction between the first electrode 44 and the second electrode 48 pushes the dielectric fluid 78 from the first end 70 of the housing 52 toward the second end 74 thereof and into the expandable fluid region 72. Pressure from the dielectric fluid 78 against the second wall 56 of the housing 52 in the expandable fluid region 72 causes the second wall 56 to deform (i.e., expand). Once the voltage being supplied to the first electrode 44 and the second electrode 48 is discontinued, the electrodes 44, 48 return to their initial, non-parallel position.

Without intending to be limited by theory, the size of the electrodes 44, 48 is proportional to the amount of displacement of the dielectric fluid 78. Therefore, when greater displacement of the dielectric fluid 78 is desired in order to deform the second wall 56 of the housing 52 to a greater degree, the size of the electrodes 44, 48 is increased relative to the size of the expandable fluid region 72.

Figure 5:
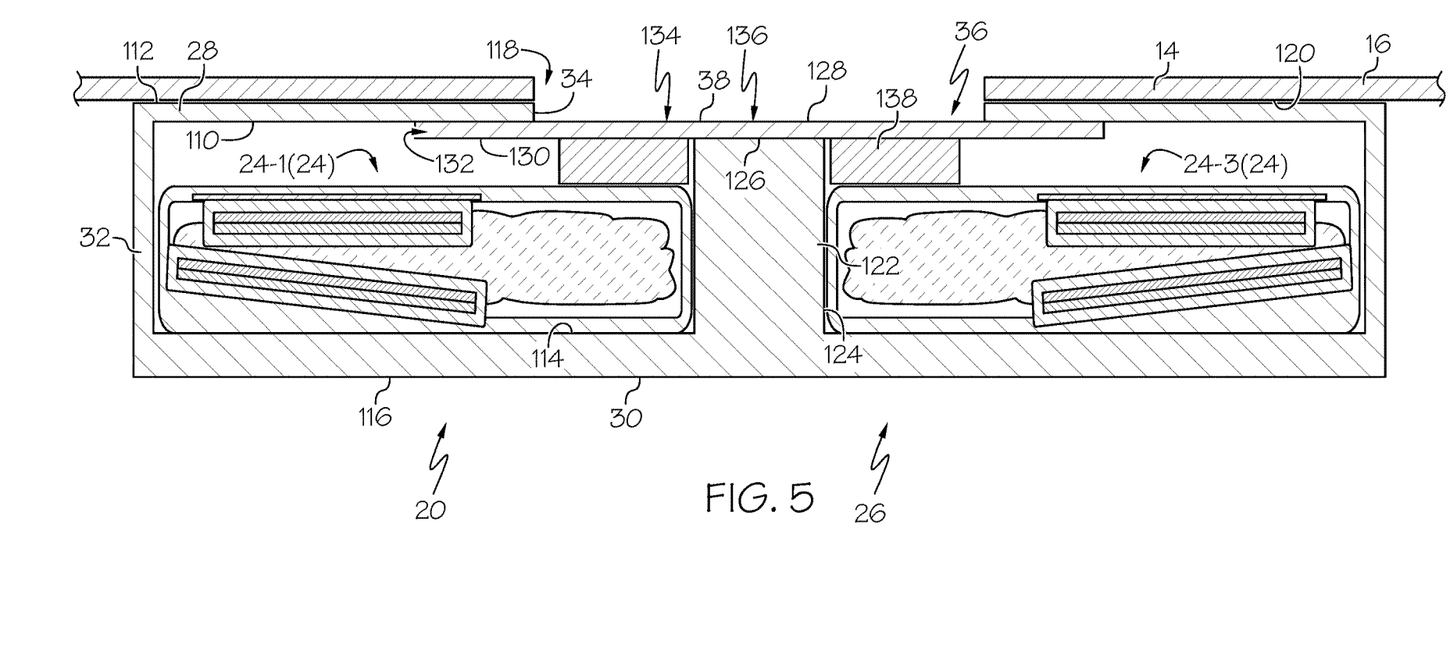
FIG. 5 schematically depicts a cross-sectional view of the suction device in the non-actuated state, according to one or more embodiments shown and described herein.
Figure 6:
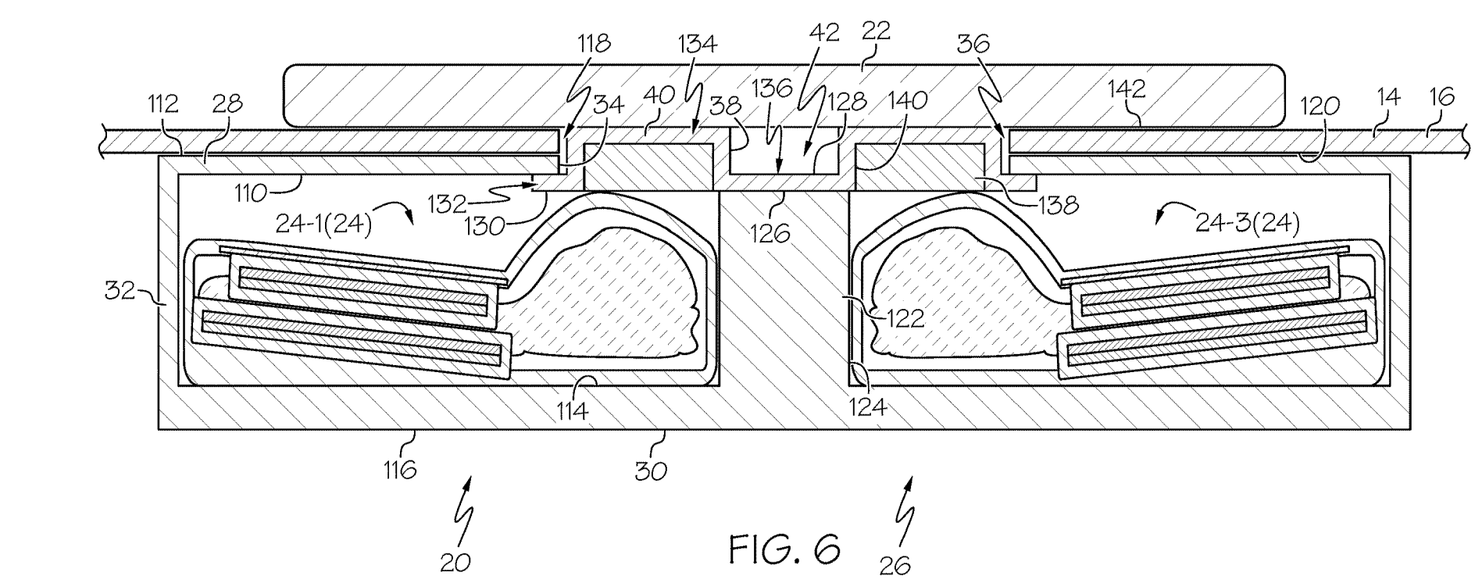
FIG. 6 schematically depicts a cross-sectional view of the suction device in the actuated state, according to one or more embodiments shown and described herein.

Referring now to FIGS. 5 and 6, a cross-sectional view of the suction device 20 including the artificial muscle 24 provided within the casing 26 is shown in the non-actuated state (FIG. 5) and the actuated state (FIG. 6). As noted above, the casing 26 includes the top wall 28, the bottom wall 30, and the side wall 32. The top wall 28 has an interior surface 110 and an exterior surface 112. Similarly, the bottom wall 30 has an interior surface 114 and an exterior surface 116. The lip 34 of the top wall 28 defines the opening 36 formed therein. As noted above, the suction device 20 may be incorporated into an interior vehicle surface 14, for example, on, within, or beneath the interior vehicle surface 14, such as the dashboard 16. As shown in FIGS. 5 and 6, the suction device 20 is located beneath the dashboard 16, but accessible through an access hole 118 formed in the dashboard 16. Specifically, the exterior surface 112 of the top wall 28 of the casing 26 is coupled to a rear surface 120 of the dashboard 16. In some embodiments, as shown in FIGS. 5 and 6, the lip 34 may be aligned with the edge of the access hole 118, such that the access hole 118 is the same size as the opening 36.

The casing 26 includes a central post 122 extending from the interior surface 114 of the bottom wall 30 within the casing 26 and has a fixed end 124 and a free end 126. In some embodiments, the central post 122 extends axially (i.e., along a central axis of the casing 26) from the interior surface 114 of the bottom wall 30, as shown in FIGS. 5 and 6, however, it should be understood that the central post 122 may have some axial offset. The fixed end 124 of the central post 122 is coupled to the interior surface 114 of the bottom wall 30 of the casing 26. The central post 122 extends from the bottom wall 30 toward the opening 36 formed in the top wall 28 of the casing 26 defined by the lip 34 and terminates at the free end 126 of the central post 122. The free end 126 of the central post 122 is provided within the casing 26. Thus, the central post 122 does not extend through the opening 36 formed in the top wall 28 of the casing 26. In some embodiments, the central post 122 has a cylindrical cross section.

The flexible member 38 extends across the opening 36 formed in the top wall 28 of the casing 26. The flexible member 38 has an exterior surface 128 and an interior surface 130 each including an edge portion 132, a body portion 134, and a central portion 136. As the flexible member 38 extends across the opening 36 formed in the top wall 28, the central portion 136 of the interior surface 130 of the flexible member 38 is fixed to the free end 126 of the central post 122. In some embodiments, as shown in FIG. 5, the central post 122 does not extend into the opening 36 formed in the top wall 28 of the casing 26. Thus, the flexible member 38 is provided between the interior surface 110 of the top wall 28 of the casing 26 and the free end 126 of the central post 122.

The edge portion 132 of the flexible member 38 abuts against the interior surface 110 of the top wall 28 and may be slidably movable therealong. In some embodiments, the edge portion 132 of the flexible member 38 may be mechanically or frictionally fixed to the interior surface 110 of the top wall 28 of the casing 26. In embodiments where the flexible member 38 is mechanically fixed to the interior surface 110 of the top wall 28, the flexible member 38 is formed from an elastic material in order to permit deformation in the body portion 134, as discussed below. Alternatively, in embodiments where the flexible member 38 is frictionally fixed to the interior surface 110 of the top wall 28, the flexible member 38 may be formed from a relatively inelastic material. In some embodiments, the central post 122 extends into the opening 36 formed in the top wall 28 of the casing 26. As such, the edge portion 132 of the interior surface 130 of the flexible member 38 may be fixed to the exterior surface 112 of the top wall 28 of the casing 26 in order to prevent separation between the flexible member 38 and the top wall 28 of the casing 26.

The suction device 20 includes a disk 138 having a bore 140. The disk 138 encircles the central post 122, such that the central post 122 extends through the bore 140 of the disk 138 and is movable along the central post 122. The disk 138 is positioned between the expandable fluid region 72 of the artificial muscle 24 and the flexible member 38. Furthermore, the disk 138 has an outer diameter less than a diameter of the opening 36 formed in the top wall 28 of the casing 26 in order to allow the disk 138 to move through the opening 36, thereby deforming the flexible member 38. When in the non-actuated state, as shown in FIG. 5, the disk 138 is located at or below the free end 126 of the central post 122 in order to avoid deforming the flexible member 38. Specifically, the disk 138 does not extend past the free end 126 of the central post 122. As such, the disk 138 does not deform any portion of the flexible member 38 in a direction toward the dashboard. This permits the flexible member 38 to remain planar when in the non-actuated state.

FIG. 6 depicts the artificial muscle 24 is in the actuated state, in which the first electrode 44 and the second electrode 48 are attracted to one another, thereby pushing the dielectric fluid 78 from the electrode region 68 to the expandable fluid region 72 and expanding the second wall 56 of the housing 52 within the expandable fluid region 72. As shown in FIG. 6, the expansion of the expandable fluid region 72 causes the disk 138 to move along the central post 122 in a direction away from the exterior surface 116 of the casing 26 (e.g., an upward or outward direction) to an actuated state and into the opening 36 formed in the top wall 28 of the casing 26. As a result, the disk 138 forms the protrusion 40 in the body portion 134 of the flexible member 38 and extends the body portion 134 into the access hole 118 formed in the dashboard 16. Further, when the object 22 is positioned over the opening 36 and the access hole 118, motion of the disk 138 extends the protrusion 40 toward the object 22. As the artificial muscle 24 expands to move the disk 138 along the central post 122 and deform the flexible member 38, the size of the protrusion 40 increases, thereby drawing air away from a rearward surface 142 of the object 22 and the flexible member 38. As a result, the suction area 42 is created and defined between the rearward surface 142 of the object 22 and the central portion 136 of the flexible member 38 within the protrusion 40. The low pressure of the suction area 42 grasps the rearward surface of the object 22 to hold the object 22 in place.

As the artificial muscle 24 is actuated back to the non-actuated state, the first electrode 44 and the second electrode 48 repel from one another and return to their initial position. In doing so, the disk 138 reverts back to the non-actuated state with respect to the central post 122. As a result, the flexible member 38 returns to its initial planar position, as shown in FIG. 5, and the tension in the suction area 42 is reduced, thereby allowing the object 22 to be removed from the suction device 20. In some embodiments, the suction device 20 includes a biasing member (not shown) to facilitate the disk 138 returning to the first position after the artificial muscle 24 actuates back to the non-actuated state.

Figure 7:
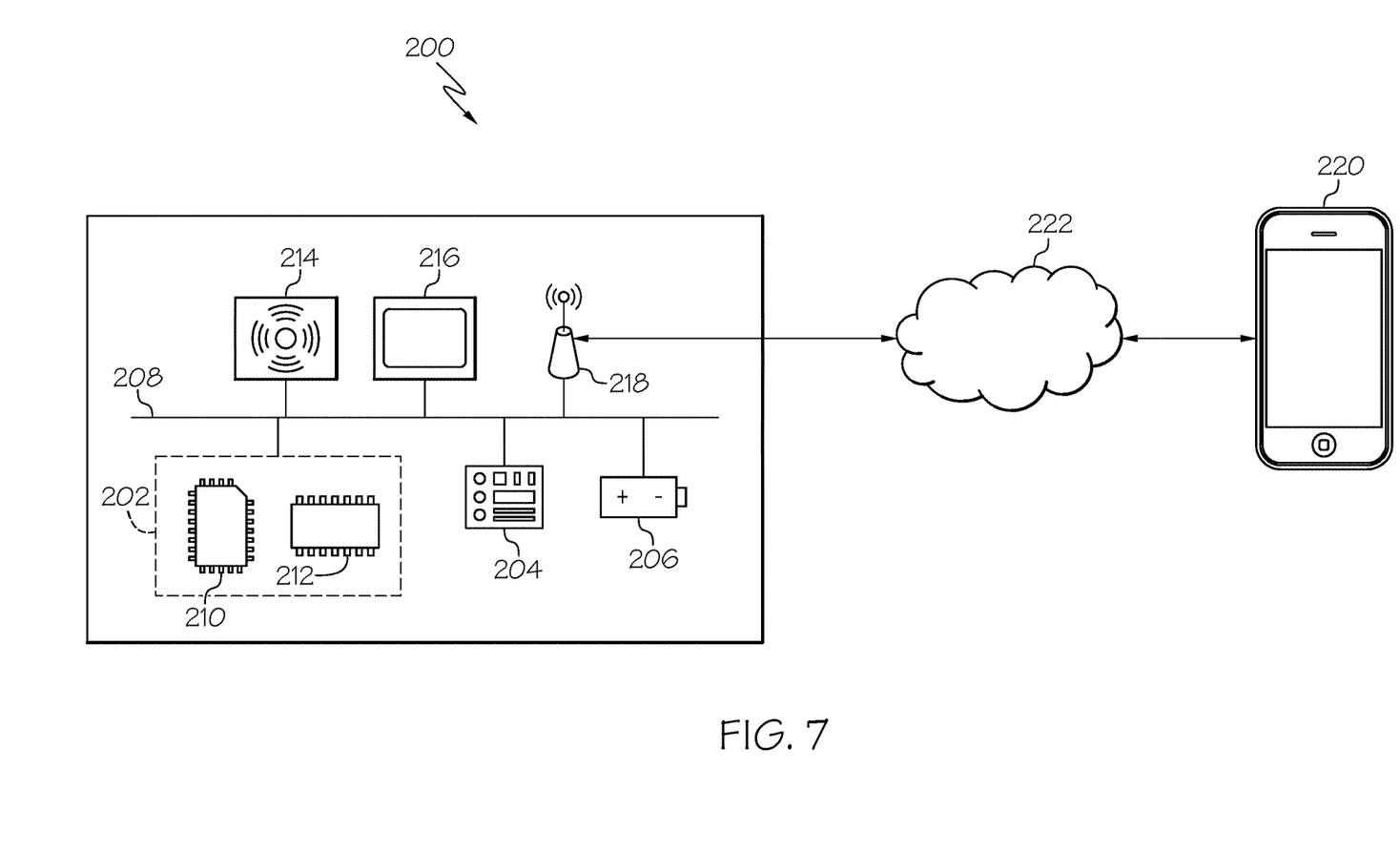
FIG. 7 schematically depicts an actuation system for operating the suction device, according to one or more embodiments shown and described herein.

Referring now to FIG. 7, an actuation system 200 may be provided for operating the artificial muscle 24 of the suction device 20 between the non-actuated state and the actuated state. The actuation system 200 may include a controller 202, an operating device 204, a power supply 206, and a communication path 208. The controller 202 includes a processor 210 and a non-transitory electronic memory 212 to which various components are communicatively coupled, as will be described in further detail below. In some embodiments, the processor 210 and the non-transitory electronic memory 212 and/or the other components are included within a single device. In other embodiments, the processor 210 and the non-transitory electronic memory 212 and/or the other components may be distributed among multiple devices that are communicatively coupled.

In addition, the controller 202 includes the non-transitory electronic memory 212 that stores a set of machine readable instructions. The processor 210 executes the machine readable instructions stored in the non-transitory electronic memory 212. The non-transitory electronic memory 212 may comprise RAM, ROM, flash memories, hard drives, or any device capable of storing machine readable instructions such that the machine readable instructions can be accessed by the processor 210. Accordingly, the actuation system 200 described herein may be implemented in any conventional computer programming language, as pre-programmed hardware elements, or as a combination of hardware and software components. The non-transitory electronic memory 212 may be implemented as one memory module or a plurality of memory modules.

In some embodiments, the non-transitory electronic memory 212 includes instructions for executing the functions of the actuation system 200. The instructions may include instructions for operating the artificial muscle 24 based on a user command or a signal from an object identification sensor 214, described below. The processor 210 may be any device capable of executing machine readable instructions. For example, the processor 210 may be an integrated circuit, a microchip, a computer, or any other computing device. The non-transitory electronic memory 212 and the processor 210 are coupled to the communication path 208 that provides signal interconnectivity between various components and/or modules of the actuation system 200. Accordingly, the communication path 208 may communicatively couple any number of processors with one another, and allow the modules coupled to the communication path 208 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

As schematically depicted in FIG. 7, the communication path 208 communicatively couples the processor 210 and the non-transitory electronic memory 212 of the controller 202 with a plurality of other components of the actuation system 200. For example, the actuation system 200 depicted in FIG. 7 includes the processor 210 and the non-transitory electronic memory 212 communicatively coupled with the operating device 204 and the power supply 206.

The operating device 204 allows for a user to control operation of the suction device 20. In some embodiments, the operating device 204 may be a switch, toggle, button, or any combination of controls provided on or within the vehicle 10 to provide user operation. The controls of the operating device 204 may be incorporated into any existing control panel of the vehicle 10 or may be provided separately, such as on a door panel or a center console of the vehicle 10. As a non-limiting example, a user may control the suction device 20 to actuate the artificial muscle 24 into the actuated state by activating controls of the operating device 204 to a first position. While in the first position, the artificial muscle 24 will remain in the actuated state. The user may control the suction device 20 to switch the artificial muscle 24 into the non-actuated state by operating the controls of the operating device 204 out of the first position and into a second position.

The operating device 204 is coupled to the communication path 208 such that the communication path 208 communicatively couples the operating device 204 to other modules of the actuation system 200. The operating device 204 may provide a user interface for receiving user instructions as to a specific operating configuration of the suction device 20. The user instructions may include instructions to operate the suction device 20 for only certain qualifying objects, such as a mobile device.

The power supply 206 (e.g., battery) provides power to the artificial muscle 24. In some embodiments, the power supply 206 is a rechargeable direct current power source separate from a battery of the vehicle 10 itself. It is to be understood that the power supply 206 may be a single power supply or battery for providing power to a plurality of artificial muscles 24. However, the power supply 206 may comprise a plurality of individual power storage devices when it is impracticable to interconnect each artificial muscle 24 to a single power supply 206. In another embodiment, the power supply 206 is the battery of the vehicle 10. In this embodiment, a power adapter (not shown) may be provided and electrically coupled via a wiring harness or the like for providing power to the artificial muscles 24 via the power supply 206.

In some embodiments, the actuation system 200 also includes a display device 216. The display device 216 is coupled to the communication path 208 such that the communication path 208 communicatively couples the display device 216 to other modules of the actuation system 200. The display device 216 may output a notification in response to an actuation state of the suction device 20 or indication of a change in the actuation state of the suction device 20. In addition, in embodiments where a plurality of suction devices 20 are provided at different locations of the vehicle 10, the display device 216 may provide an indication of the actuation state of each of the suction devices 20. The display device 216 may include any medium capable of transmitting an optical output such as, for example, a cathode ray tube, light emitting diodes, a liquid crystal display, a plasma display, or the like. Moreover, the display device 216 may be a touchscreen that, in addition to providing optical information, detects the presence and location of a tactile input upon a surface of or adjacent to the display device 216. Accordingly, the display device 216 may include the operating device 204 and receive mechanical input directly upon the optical output provided by the display device 216.

In some embodiments, the actuation system 200 also includes the object identification sensor 214, as discussed herein. The object identification sensor 214 is coupled to the communication path 208 such that the communication path 208 communicatively couples the object identification sensor 214 to other modules of the actuation system 200. The object identification sensor 214 may include any suitable sensor for detecting the presence of the object within proximity to the suction device. As noted above, the memory 212 may include instructions for operating the suction device 20 based on the presence of the object 22. In some embodiments, the suction device 20 may operate when the object identification sensor 214 detects, for example, the presence of the object 22 either in contact with the suction device 20 or within proximity of the suction device 20 and the object identification sensor 214 transmits a signal to the processor 210. In addition, the object identification sensor 214 may be configured to only transmit a signal to the processor 210 when the object is identified as a qualifying object. As such, the memory 212 may include a stored list of qualifying objects, such as user-specific mobile devices, and permit the signal to be transmitted only when the object 22 detected by the object identification sensor 214 appears on the stored list in the memory 212.

In some embodiments, the actuation system 200 includes network interface hardware 218 for communicatively coupling the actuation system 200 to a portable device 220 via a network 222. The network interface hardware 218 can be communicatively coupled to the communication path 208 and can be any device capable of transmitting and/or receiving data via the network 222. The portable device 220 may include, without limitation, a smartphone, a tablet, a personal media player, or any other electric device that includes wireless communication functionality. In some embodiments the portable device 220 may include the object 22 itself. It is to be appreciated that, when provided, the portable device 220 may serve to provide user commands to the controller 202, instead of the operating device 204. As such, a user may be able to control or set a program for controlling the suction device 20 without utilizing the controls of the operating device 204 in the vehicle 10 itself. Thus, the suction device 20 may be controlled remotely via the portable device 220 wirelessly communicating with the controller 202 via the network 222.

From the above, it is to be appreciated that defined herein is suction device for securing on object by selectively actuating at least one artificial muscle to raise and lower a region of the suction device and providing a suction area. The suction device provides a low profile device holder for a vehicle that can be incorporated directly into the dashboard of the vehicle. The suction device operates automatically, on demand and provides an easy to use device holder.

It is noted that the terms "substantially" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A suction device comprising:
a casing having a top wall, a bottom wall, and a central post extending from the bottom wall;
a flexible member provided across a free end of the central post;
an artificial muscle housed within the casing, the artificial muscle comprising:
a housing having a first wall, a second wall opposite the first wall, an expandable fluid region, and an electrode region adjacent the expandable fluid region;
a dielectric fluid housed within the housing; and
an electrode pair housed within the electrode region of the housing, the electrode pair including a first electrode coupled to the first wall and a second electrode coupled to the second wall,
wherein the electrode pair is actuatable between a non-actuated state and an actuated state such that actuation of the electrode pair from the non-actuated state to the actuated state directs the dielectric fluid into the expandable fluid region,
wherein, when the electrode pair of the artificial muscle is in the actuated state, the artificial muscle deforms the flexible member to form a suction area at the free end of the central post.

2. The suction device of claim 1, wherein the casing has a lip formed in the top wall of the casing, the lip encircling the free end of the central post and defining an opening.

3. The suction device of claim 2, wherein the flexible member has a central portion, a body portion, and an edge portion, the central portion secured to the free end of the central post and the edge portion secured to the top wall of the casing.

4. The suction device of claim 3, wherein, when the electrode pair is in the actuated state, at least a portion of the body portion of the flexible member extends through the opening in the top wall of the casing and away from the free end of the central post.

5. The suction device of claim 1, wherein the first electrode and the second electrode of the artificial muscle each comprise an inner polymer film and a metal film, the first electrode and the second electrode each coated in a polymer cover coating.

6. The suction device of claim 1, further comprising a disk encircling the central post, the disk forming a protrusion in the flexible member when the electrode pair is in the actuated state.

7. The suction device of claim 1, further comprising a stiffening film between the housing and one of the first and second electrodes.

8. The suction device of claim 1, further comprising a plurality of artificial muscles positioned in contact with one another, each artificial muscle of the plurality of artificial muscles having an expandable fluid region.

9. The suction device of claim 8, wherein the expandable fluid region of each artificial muscle of the plurality of artificial muscles is arranged to be adjacent the central post.

10. The suction device of claim 1, further comprising a controller communicatively coupled to the electrode pair of the artificial muscle, wherein the controller is configured to direct a voltage from a power supply across the first electrode and the second electrode of the artificial muscle to actuate the electrode pair from the non-actuated state to the actuated state.

11. The suction device of claim 1, wherein at least one of the first wall and the second wall of the housing of the artificial muscle includes an interior tapered portion within the electrode region.

12. A vehicle comprising:
an interior vehicle surface;
a suction device provided beneath the interior vehicle surface, the suction device comprising:
a casing having a top wall, a bottom wall, and a central post extending from the bottom wall of the casing;
a flexible member provided across a free end of the central post;
an artificial muscle housed within the casing, the artificial muscle comprising:
a housing having a first wall, a second wall opposite the first wall, an expandable fluid region, and an electrode region adjacent the expandable fluid region;
a dielectric fluid housed within the housing; and
an electrode pair housed within the electrode region of the housing, the electrode pair including a first electrode coupled to the first wall and a second electrode coupled to the second wall,
wherein the electrode pair is actuatable between a non-actuated state and an actuated state such that actuation of the electrode pair from the non-actuated state to the actuated state directs the dielectric fluid into the expandable fluid region,
wherein, when the electrode pair of the artificial muscle is in the actuated state, the artificial muscle deforms the flexible member to form a suction area at the free end of the central post.

13. The vehicle of claim 12, wherein the casing has a lip formed in the top wall of the casing, the lip encircling the free end of the central post and defining an opening.

14. The vehicle of claim 13, wherein the flexible member has a central portion, a body portion, and an edge portion, the central portion secured to the free end of the central post and the edge portion secured to the top wall of the casing.

15. The vehicle of claim 14, wherein, when the electrode pair is in the actuated state, at least a portion of the body portion of the flexible member extends through the opening in the top wall of the casing and an opening formed in the interior vehicle surface and away from the free end of the central post.

16. The vehicle of claim 12, wherein the first electrode and the second electrode are configured to zipper when actuated.

17. A method comprising:
positioning an object over an access hole formed in an interior vehicle surface, wherein the access hole is aligned with a suction device, the suction device comprising:
a casing having a top wall, a bottom wall, and a central post extending from the bottom wall of the casing;
a flexible member provided across a free end of the central post; and
an artificial muscle housed within the casing, the artificial muscle comprising:
a housing having a first wall and a second wall opposite the first wall, the housing having an expandable fluid region and an electrode region adjacent the expandable fluid region;
a dielectric fluid housed within the housing; and
an electrode pair housed within the electrode region of the housing, the electrode pair including a first electrode coupled to the first wall and a second electrode coupled to the second wall,
grasping the object by actuating the electrode pair of the artificial muscle of the suction device from a non-actuated state to an actuated state to direct the dielectric fluid into the expandable fluid region, thereby deforming the flexible member to form a suction area at the free end of the central post.

18. The method of claim 17, wherein actuation of the electrode pair of the artificial muscle is caused by user operation of an operating device.

19. The method of claim 17, wherein actuation of the electrode pair of the artificial muscle is caused by a proximity device identifying a presence of the object in relation to the suction device.

20. The method of claim 17, wherein, when the electrode pair is in the actuated state, the flexible member includes a protrusion extending through an opening in the top wall of the casing and away from the free end of the central post, the protrusion formed by a disk encircling the central post and contacting the expandable fluid region of the artificial muscle.

* * * * *